Patented Mar. 4, 1924.

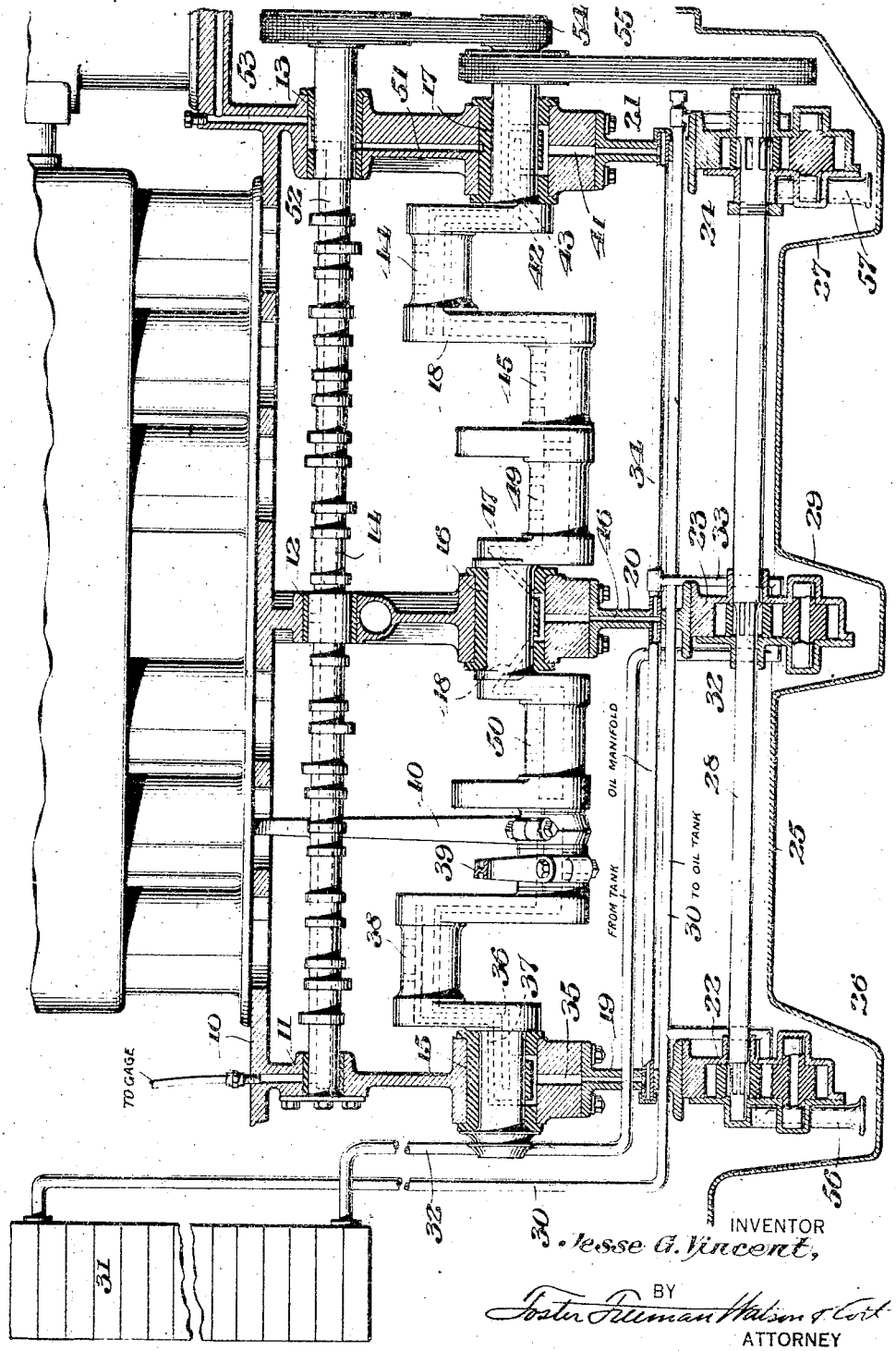

1,485,537

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed January 14, 1918. Serial No. 211,885.

*To all whom it may concern:*

Be it known that I, JESSE G. VINCENT, a citizen of the United States, and residing at Detroit, Wayne County, State of Michigan, have invented certain new and useful Improvements in Hydrocarbon Motors, of which the following is a specification.

The present invention relates to hydrocarbon motors and more particularly to such motors for airplanes.

The principal object of the invention is to provide a means for maintaining the crank case of the air plane motor substantially dry of oil, so that the plane may be propelled in an upside down position without the troubles which result from the presence of a supply of oil in the crank case. To this end an exceedingly compact and simply arranged means is employed for removing oil, of a capacity greater than the rate at which it is supplied. Other objects and features of novelty will be apparent from the description taken in connection with the drawings in which:—

The single figure is a longitudinal sectional view through the crank case of a hydrocarbon motor of the type having twelve cylinders arranged in two groups of six each, one set of cylinders being shown in elevation, and the oil reservoir or radiator also being shown in elevation.

As shown, the upper half 10 of the crank case has the usual bearings 11, 12 and 13 for the cam shaft 14, and the bearings 15, 16 and 17 for the crank shaft 18.

Each of the crank shaft bearings 15, 16 and 17 has a depending bracket 19, 20 and 21, respectively, secured to the caps of said bearings, and these brackets carry the pumps 22, 23 and 24 respectively, the bolts which secure the caps being utilized to fasten the brackets. The lower half 25 of the crank case is formed at one end thereof with the oil drain or well 26 and at the other end with a similar oil drain or well 27, these wells receiving the pumps 22 and 24 respectively and being of such shape that there is very little clearance between the pump and the walls of the wells. The pumps 22, 23 and 24 are aligned and have the common driving or pump shaft 28. Under the pump 23, the lower half of the crank case is formed with a pocket 29 which surrounds the portion of the pump which projects below the bottom of the crank case. The pumps 22 and 24 are suction pumps and act to withdraw the oil which collects in the pockets 26 and 27 and discharge it into the header 30 which carries the oil to the oil reservoir or radiator 31. The pump 23 has a suction pipe 32 connected to the lower part of the oil reservoir and a discharge pipe 33 connected to an oil manifold or header 34. This header at one end is connected to discharge into the conduit 35 in the bracket or support 19 and associated bearing cap which supplies the bearing 15 and also the conduits 36 and 37 formed in the crank shaft. The conduit 36 supplies the piston rod bearing 38 and the conduit 37 supplies the bearing for the piston rods 39 and 40. The other end of the header 34 is arranged to supply the duct 41 in the bracket 21 and associated bearing cap which is connected to oil the crank shaft bearing 17 and supply the conduits 42 and 43 in the crank shaft, the conduit 43 carrying oil to the piston rod bearing 44, and the conduit 42 serving to deliver oil to the bearing 45. The header 34 also through the duct 46 in the bracket or support 20 and the associated bearing cap supplies oil to the bearing 16 and the conduits 47 and 48 formed in the crank shaft, the conduit 47 carrying oil to the bearing 49 and the conduit 48 supplying oil to the bearing 50.

The duct 41 extends around the crank shaft bearing 17 and has a continuation 51 which supplies oil to cam shaft bearing 13 and the duct 52 formed therein. This duct extends substantially throughout the length of the cam shaft and distributes oil to the other bearings 11 and 12 thereof. The duct 53 formed in the wall of the crank case above the cam shaft bearing 13 and connected therewith serves to carry oil to the electrical distributing apparatus (not shown).

The cam shaft is driven from the crank shaft by means of the chain gearing 54 and the pump driving shaft is also driven from the crank shaft by a chain gearing 55.

From the foregoing it will be seen that the force pump 23 takes oil from the oil reservoir and forces it to the various bearings of the motor. As this oil leaves the bearings it drains into the small wells 26 and 27 and the small pocket 29. Suction pumps 22 and 24, which have their suctions 56 and 57 respectively close to the bottom of the wells, act to withdraw substantially all of the oil which has drained into the said wells 26 and 27, and discharge it through the header 30 into the oil reservoir. Preferably each of the suction pumps 22 and 24 has a capacity at least equal to that of the force pump 23. Hence, either pump alone can handle all of the oil supplied by the pump 23, if it should happen to all drain into its associated well. It is therefore apparent that the crank case of the motor will be kept dry of oil. The small quantity which may accumulate in the pocket 29 will not be enough to interfere in any way with the operation of the motor if the plane is propelled in an upside down position.

As shown the oil reservoir is in the form of a radiator which cools the oil as it passes through the same. It is to be understood, however, that the invention is not limited to this form of reservoir as other means for storing the oil might be used. Indeed the reservoir might be omitted and the oil taken from the wells pumped directly to the force pump, the conduits connecting the suction and force pumps, in this case acting as the reservoir.

In addition to providing a means for maintaining the crank case of the motor substantially dry of oil, it will be observed that the pumps for accomplishing this purpose are arranged in a very rigid and yet simple manner.

Although a specific arrangement of oil ducts and conduits has been described whereby the oil is forced to the several bearings of the motor, it is to be understood that the invention is not limited to any particular arrangement of the means for lubricating the bearings. Furthermore the invention is not limited to a twelve-cylinder motor, but on the other hand is adapted for use in many different types of hydrocarbon motors.

Having thus described the invention, what I claim is:

1. An airplane motor including in combination, a crank case having a small oil well in the bottom thereof, an oil reservoir, means for taking oil from said reservoir and forcing it to the motor bearings, and a pump supported from one of the crank shaft bearings having its suction at the bottom of the well and discharging into the reservoir.

2. An airplane motor including in combination, a crank case having a small oil well in the bottom thereof, an oil reservoir, a pump supported from one of the crank shaft bearings for taking oil from said reservoir and forcing it to the motor bearings, a pump supported from another bearing having its suction at the bottom of the well and discharging into the reservoir and a common driving shaft for said pumps.

3. An airplane motor including in combination, a crank case having a small oil well in the bottom under the rear crank shaft bearing, an oil reservoir, means for taking oil from said reservoir and forcing it to the motor bearings and a pump supported from said rear crank shaft bearing having its suction at the bottom of the well and discharging into the reservoir.

4. An airplane hydrocarbon motor including in combination, an oil reservoir, a crank case having a small oil well in the bottom thereof under one of the crank shaft bearings, and a pocket under another of the crank shaft bearings, a pump supported by said latter bearing projecting into said pocket for forcing oil from the reservoir to the motor bearings, a second pump aligned with the first pump supported by the first mentioned bearing projecting into the well, having its suction in the well and discharging into the reservoir, and a common driving shaft for said pumps.

5. An airplane hydrocarbon motor including in combination, an oil reservoir outside the motor, the crank case having a well under the front crank shaft bearing, a well under the rear bearing and a well under an intermediate bearing, a pump supported by each of said bearings and projecting into the associated well, one of said pumps taking oil from said reservoir and forcing it to the motor bearings, the other pumps each draining the oil from its respective well and returning it to the reservoir.

6. An airplane motor including in combination, means for supplying the bearings thereof with oil and maintaining a substantially dry crank case including an oil well in the bottom of the crank case, and a pump supported from a crank shaft bearing projecting into said well for withdrawing substantially all the oil which drains into the well.

7. In combination with a travelling hydrocarbon motor having a crank case, an oil reservoir, three pumps disposed in said case, two pumps having their suctions at opposite ends of the crank case and near the bottom thereof and discharging into said reservoir, the third pump having its suction connected to said reservoir, a header into which said third pump discharges, and separate conduits leading from said header to each of the crank shaft bearings 8. In combination with a travelling hydrocarbon motor having a crank case, an oil reservoir, three pumps disposed in said case, two pumps having their suctions at opposite ends of the crank case and near the bottom thereof and discharging into said reservoir, the third pump having its suction connected to said reservoir, a header into which said third pump discharges, separate conduits leading from said header to each of the crank shaft bearings and a support for the third pump secured to one of the crank shaft bearings.

9. In combination with a travelling hydrocarbon motor having a crank case, an oil reservoir, three pumps disposed in said case, two pumps having their suctions at opposite ends of the crank case and near the bottom thereof and discharging into said reservoir, the third pump having its suction connected to said reservoir, a header into which said third pump discharges, separate conduits leading from said header to each of the crank shaft bearings and a support for the third pump secured to one of the crank shaft bearings, the conduit for the last mentioned bearing being formed in said support.

10. In combination with a travelling hydrocarbon motor having a crank case, an oil reservoir, three pumps disposed in said case, two pumps having their suctions at opposite ends of the crank case and near the bottom thereof and discharging into said reservoir, the third pump having its suction connected to said reservoir, a support for each pump secured to a crank shaft bearing, each of said supports and associated bearing having a conduit opening at one end against the crank shaft, and means to convey the discharge from the third pump to each of said conduits.

11. In combination with a travelling hydrocarbon motor having a crank case, an oil reservoir, three pumps disposed in said case, two pumps having their suctions at opposite ends of the crank case and near the bottom thereof and discharging into said reservoir, the third pump having its suction connected to said reservoir, a support for each pump secured to a crank shaft bearing, each of said supports and associated bearing having a conduit opening at one end against the crank shaft, and a header into which said third pump discharges, said header being in communication with said conduits.

12. In combination with a travelling hydrocarbon motor having a crank case, three pumps disposed in said case spaced longitudinally thereof, supports for said pumps secured to the crank shaft bearings by the bearing cap bolts, an oil reservoir, two of said pumps having their suctions at opposite ends of the crank case and discharging into the reservoir, and the third pump having its suction connected to the reservoir and conduits conveying the discharge from the third pump to the crank shaft bearings.

13. In combination with a travelling hydrocarbon motor having a crank case, three pumps disposed in said case spaced longitudinally thereof, supports for said pumps secured to the crank shaft bearings by the bearing cap bolts, the supports and bearing caps being formed with conduits, an oil reservoir, two of said pumps having their suctions at opposite ends of the crank case and discharging into the reservoir, and the third pump having its suction connected to the reservoir and discharging into said conduits.

14. A hydrocarbon motor including in combination, a crank case, an oil reservoir, means for taking oil from said reservoir and forcing it to the motor bearings, and a pump supported from one of the crank shaft bearings having its suction at the bottom of the crank case and discharging into said reservoir.

15. A hydrocarbon motor including in combination, a crank case, an oil reservoir, a pump supported from one of the crank shaft bearings for taking oil from said reservoir and forcing it to the motor bearings, and a second pump supported from another bearing having its suction at the bottom of said crank case.

16. A hydrocarbon motor including in combination, a crank case, an oil reservoir, a pump supported from one of the crank shaft bearings for taking oil from said reservoir and forcing it to the motor bearings, a second pump supported from another bearing having its suction at the bottom of said crank case, and a common driving shaft for said pumps.

17. A hydrocarbon motor including in combination, a crank case, and means for lubricating said motor including a pump supported from one of the crank shaft bearings.

18. A hydrocarbon motor including in combination, a crank case, and means for lubricating said motor including a pump supported from one of the crank shaft bearings and having its suction at the bottom of the crank case.

19. A hydrocarbon motor including in combination, a crank case, means for lubricating the motor including pumping mechanism supported from the crank shaft bearings.

20. A hydrocarbon motor including in combination, a crank case having an oil well therein, means to take oil from said well and circulate to the bearings of the motor including a pump supported from one of the crank shaft bearings and having its suction at the bottom of said well.

21. A hydrocarbon motor including in combination, a crank case having two spaced oil wells in the bottom thereof and means to lubricate the motor including a pump for each well supported from the crank shaft bearings, each pump having its suction at the bottom of the associated well.

22. A hydrocarbon motor including in combination, a crank case having two spaced oil wells in the bottom thereof, means to lubricate the motor including a pump for each well supported from the crank shaft bearings, each pump having its suction at the bottom of the associated well, and a common driving shaft for said pumps.

In testimony whereof I affix my signature in presence of two witnesses.

JESSE G. VINCENT.

Witnesses:
MARIE GILDEMEISTER,
WALTER D. CLINE.